US011653190B2

(12) United States Patent
Luo et al.

(10) Patent No.: US 11,653,190 B2
(45) Date of Patent: May 16, 2023

(54) BLUETOOTH COMMUNICATION METHOD AND DEVICE, AND STORAGE MEDIUM AND TERMINAL

(71) Applicant: RDA MICROELECTRONICS TECHNOLOGIES (SHANGHAI) CO., LTD., Shanghai (CN)

(72) Inventors: Liyun Luo, Shanghai (CN); Kai Li, Shanghai (CN); Guochu Chen, Shanghai (CN); Zhongxing Yu, Shanghai (CN); Wenqiang Tian, Shanghai (CN); Wei Liu, Shanghai (CN)

(73) Assignee: RDA Microelectronics Technologies (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 17/855,534

(22) Filed: Jun. 30, 2022

(65) Prior Publication Data

US 2022/0337987 A1 Oct. 20, 2022

Related U.S. Application Data

(63) Continuation of application No. PCT/CN2020/084829, filed on Apr. 15, 2020.

(30) Foreign Application Priority Data

Dec. 31, 2019 (CN) .......................... 201911409663.8

(51) Int. Cl.
*H04W 4/80* (2018.01)
*H04L 1/00* (2006.01)
(Continued)

(52) U.S. Cl.
CPC ............. *H04W 4/80* (2018.02); *H04L 1/0061* (2013.01); *H04L 27/32* (2013.01); *H04W 84/18* (2013.01)

(58) Field of Classification Search
CPC ..... H04W 4/80; H04W 84/18; H04W 28/065; H04W 28/22; H04W 72/0446;
(Continued)

(56) References Cited

U.S. PATENT DOCUMENTS 9,712,951 B2 * 7/2017 Kirshenberg ........... H04W 4/80
10,305,781 B2 * 5/2019 Jin .................... H04W 28/0268
(Continued)

FOREIGN PATENT DOCUMENTS

CN 104467925 A 3/2015
CN 105898672 A 8/2016
(Continued)

OTHER PUBLICATIONS

Vo-Huu, Tien (2022). Software defined radio: A double-edged sword for security and privacy in wireless systems (Order No. 29068281). Available from ProQuest Dissertations and Theses Professional. (2719437566). Retrieved from https://dialog.proquest.com/professional/docview/2719437566?accountid=131444 (Year: 2022).*

(Continued)

*Primary Examiner* — Lana N Le
(74) *Attorney, Agent, or Firm* — Schwabe, Williamson & Wyatt, PC

(57) ABSTRACT

A Bluetooth communication method and device, and storage medium and terminal are provided. The method includes: generating a frame to be transmitted, wherein the frame to be transmitted comprises at least a Preamble, an Access Code, a Header, an Enhanced Data Rate Payload and a Trailer, wherein a configuration mode of the Preamble is consistent with a configuration mode of a Preamble in an LE frame, a configuration mode of the Header, the Enhanced Data Rate Payload and the Trailer are consistent with configuration modes of corresponding parts in an EDR
(Continued)

frame, a configuration mode of the Access Code is consistent with a configuration mode of an Access Code in the LE frame and a configuration mode of an Access Code in the EDR frame; and generating and transmitting the frame to be transmitted by a modulation mode of the EDR frame and a Symbol Rate of the LE frame.

15 Claims, 3 Drawing Sheets

(51) Int. Cl.
  *H04L 27/32* (2006.01)
  *H04W 84/18* (2009.01)
(58) Field of Classification Search
  CPC ..... H04L 1/0061; H04L 27/32; H04L 5/0053; H04L 1/0003; H04L 1/0007; H04L 27/26; H04L 27/12; H04L 27/10; H04L 27/2646; H04L 7/041; H04L 2027/0095; H04L 1/0618; H04L 27/2602; H04L 5/0017; H04L 1/0072; H04L 27/2607
  See application file for complete search history.

(56) References Cited

U.S. PATENT DOCUMENTS

| 10,631,142 | B2* | 4/2020 | Li | H04L 1/0059 |
| 11,284,360 | B1* | 3/2022 | Wu | H04L 1/201 |
| 2009/0116462 | A1* | 5/2009 | Powell | H04L 27/20 370/328 |
| 2015/0237462 | A1 | 8/2015 | Han | |
| 2015/0327001 | A1 | 11/2015 | Kirshenberg | |
| 2016/0157078 | A1 | 6/2016 | Palin | |
| 2018/0048444 | A1* | 2/2018 | Park | H04L 5/005 |
| 2018/0192381 | A1* | 7/2018 | Kwon | H04W 4/80 |
| 2018/0270876 | A1 | 9/2018 | Ding | |
| 2019/0104424 | A1 | 4/2019 | Hariharan | |
| 2020/0228275 | A1* | 7/2020 | Li | H04W 56/0025 |
| 2020/0374030 | A1* | 11/2020 | Liu | H04L 45/74 |

FOREIGN PATENT DOCUMENTS

| CN | 110166989 A | 8/2019 | |
| WO | WO-2017156224 A1 * | 9/2017 | H04L 27/2602 |

OTHER PUBLICATIONS

Patent Cooperation Treaty: International Search Report and Written Opinion for PCT/CN2020/084829 dated Sep. 28, 2020; 8 pages, including English translation of Search Report.

* cited by examiner

| Preamble | Access Code | Header | Guard | SYNC | Enhanced Data Rate Payload | CRC | Trailer |

BLUETOOTH COMMUNICATION METHOD AND DEVICE, AND STORAGE MEDIUM AND TERMINAL

CROSS-REFERENCE TO RELATED APPLICATIONS

This application is a continuation application of International Application No. PCT/CN2020/084829, filed on Apr. 15, 2020, which claims priority to Chinese Patent Application No. 201911409663.8, filed on Dec. 31, 2019, and entitled "BLUETOOTH COMMUNICATION METHOD AND DEVICE, AND STORAGE MEDIUM AND TERMINAL", the entire disclosure of which is incorporated herein by reference.

TECHNICAL FIELD

The present disclosure generally relates to communication technology field, and more particularly, to a Bluetooth communication method and device, and storage medium and terminal.

BACKGROUND

Bluetooth is a wireless technology standard which may realize a short-range data exchange among fixed devices, mobile devices, and building personal area networks.

Latest Bluetooth 5.0 standard, which is a new generation of Bluetooth technology standard released by a Bluetooth technical alliance in 2016, including a Low Energy (LE) scheme and its frame structure proposed with the 5.0 standard, are getting more and more attention. Bluetooth 4 (including Bluetooth 4.0, 4.1, 4.2) early than the Bluetooth 5.0 standard includes an Enhanced Data Rate (EDR) scheme and its frame structure, which have been widely used.

However, in existing Bluetooth communication methods, a highest Bit Rate is only 3 Mb/s, and a highest Symbol Rate proposed in the Bluetooth 5.0 is only 2 Msym/s, which is difficult to meet the demand Therefore, there is a need for a Bluetooth communication method to improve transmission rate effectively.

SUMMARY

Embodiments of the present disclosure provide a Bluetooth communication method and device, and storage medium and terminal, which may improve transmission rate effectively.

In an embodiment of the present disclosure, a Bluetooth communication method is provided, including: generating a frame to be transmitted, wherein the frame to be transmitted includes at least a Preamble, an Access Code, a Header, an Enhanced Data Rate Payload and a Trailer, wherein a configuration mode of the Preamble is consistent with a configuration mode of a Preamble in an Low Energy (LE) frame, a configuration mode of the Header, the Enhanced Data Rate Payload and the Trailer are consistent with configuration modes of corresponding parts in an Enhanced Data Rate (EDR) frame, a configuration mode of the Access Code is consistent with a configuration mode of an Access Code in the LE frame and a configuration mode of an Access Code in the EDR frame; and generating and transmitting the frame to be transmitted by a modulation mode of the EDR frame and a Symbol Rate of the LE frame.

In an embodiment of the present disclosure, a Bluetooth communication device is provided, including: a generation circuitry, adapted to generate a frame to be transmitted, wherein the frame to be transmitted includes at least a Preamble, an Access Code, a Header, an Enhanced Data Rate Payload and a Trailer, wherein a configuration mode of the Preamble is consistent with a configuration mode of a Preamble in an Low Energy (LE) frame, a configuration mode of the Header, the Enhanced Data Rate Payload and the Trailer are consistent with configuration modes of corresponding parts in an Enhanced Data Rate (EDR) frame, a configuration mode of the Access Code is consistent with a configuration mode of an Access Code in the LE frame and a configuration mode of an Access Code in the EDR frame; and a transmitting circuitry, adapted to generate and transmit the frame to be transmitted by a modulation mode of the EDR frame and a Symbol Rate of the LE frame.

In an embodiment of the present disclosure, a non-transitory storage medium is provided, the storage medium storing one or more programs, the one or more programs comprising computer instructions, which, when executed by a processor, cause the processor to: generate a frame to be transmitted, wherein the frame to be transmitted comprises at least a Preamble, an Access Code, a Header, an Enhanced Data Rate Payload and a Trailer, wherein a configuration mode of the Preamble is consistent with a configuration mode of a Preamble in an Low Energy (LE) frame, a configuration mode of the Header, the Enhanced Data Rate Payload and the Trailer are consistent with configuration modes of corresponding parts in an Enhanced Data Rate (EDR) frame, a configuration mode of the Access Code is consistent with a configuration mode of an Access Code in the LE frame and a configuration mode of an Access Code in the EDR frame; and generate and transmit the frame to be transmitted by a modulation mode of the EDR frame and a Symbol Rate of the LE frame.

DETAILED DESCRIPTION

Latest Bluetooth 5.0 standard, which is a new generation of Bluetooth technology standard released by a Bluetooth technical alliance in 2016, including a Low Energy (LE) scheme and its frame structure proposed with the 5.0 standard, are getting more and more attention. Bluetooth 4 (including Bluetooth 4.0, 4.1, 4.2) early than the Bluetooth 5.0 standard includes an Enhanced Data Rate (EDR) scheme and its frame structure, which have been widely used.

Figure 1:
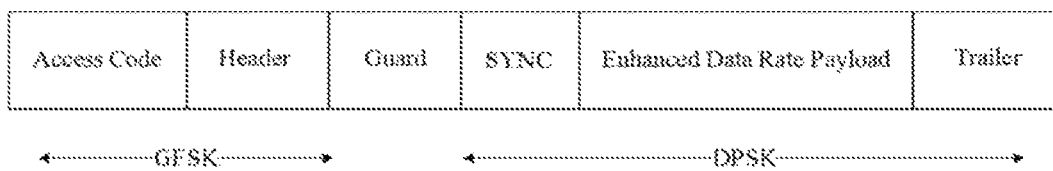
FIG. 1 schematically illustrates a frame structure diagram of an EDR frame in an existing technology.

Referring to FIG. 1, FIG. 1 schematically illustrates a frame structure diagram of an EDR frame in an existing technology.

The EDR frame may include an Access Code, a Header, a Guard, a Synchronized (SYNC), an Enhanced Data Rate Payload and a Trailer.

The Access Code may be used for synchronization, DC, carrier frequency leak bias compensation identifications; the Enhanced Data Rate Payload may be used for carrying data to be transmitted.

The Access Code and the Header may be realized by a Gauss Frequency Shift Keying (GFSK) modulation mode. Specifically, a spectral width of a signal may be limited by a Gaussian low-pass filter before a modulation.

The SYNC, the Enhanced Data Rate Payload and the Trailer may be realized by a Differential Phase Shift Keying (DPSK) modulation mode. Specifically, the information may be transmitted by a relative phase change of carriers between symbols before and after of a modulated signal.

For other information about the EDR frame, the settings in the existing technology may be applied, which is not repeated here.

Figure 2:
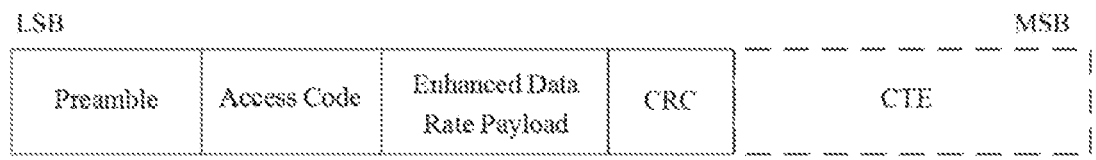
FIG. 2 schematically illustrates a frame structure diagram of an LE frame in an existing technology.

Referring to FIG. 2, FIG. 2 schematically illustrates a frame structure diagram of an LE frame in an existing technology.

The LE frame may include: a Preamble, an Access Code, a Protocol Data Unit (PDU) and a Cyclic Redundancy Check (CRC). In a specific LE frame, a ConstantTone Extension (CTE) may also be included.

The Access Code in the LE frame may be called an Access-Address, which may be configured in a same way as the Access Code in the EDR frame. Therefore, an association relationship may be established between the LE frame and the EDR frame via the Access Code.

The PDU may be used for carrying data to be transmitted.

In a specific implementation of the existing technology, between a Last/Least Significant Bit (LSB) and a Most Significant Bit (MSB), the Preamble is set to occupy 1 or 2 octets, the Access Code is set to occupy 4 octets, the PDU is set to occupy 2 to 258 octets, and the CRC is set to occupy 3 octets. Wherein, 1 octet=8 bit.

In an existing Bluetooth communication method, a Bit Rate of a highest transmission rate of the EDR frame is 3 Mb/s, a Symbol Rate of the highest transmission rate of the EDR frame is 1 Msym/s, and a modulation mode is a 8 DPSK. A Bit Rate of a highest transmission rate of the LE frame is 2 Mb/s, a Symbol Rate of the highest transmission rate of the LE frame is 2 Msym/s, and a modulation mode is a GFSK.

Inventors found through research that, in the existing technology, due to different modulation modes, the Bit Rate of the highest data transmission rate of the LE frame is 2 Mb/s, the Symbol Rate of the highest transmission rate of the LE frame is 2 Msym/s, and a ratio of the Bit Rate to the Symbol Rate is only 1:1, which is difficult to meet requirement of the transmission rate. The Bit Rate of the highest data transmission rate of the EDR frame is 3 Mb/s, the Symbol Rate of the highest transmission rate of the EDR frame is 1 Msym/s, and a ratio of the Bit Rate to the Symbol Rate is 3:1. On the basis of a same Symbol Rate, using the modulation mode of the EDR frame and the Symbol Rate of the LE frame to transmit, a more efficient transmission rate may be obtained.

In an embodiment of the present disclosure, a frame to be transmitted is generated; the frame to be transmitted includes at least a Preamble, an Access Code, a Header, an Enhanced Data Rate Payload and a Trailer. A configuration mode of the Preamble is consistent with a configuration mode of a Preamble in an LE frame. A configuration mode of the Header, the Enhanced Data Rate Payload and the Trailer are consistent with configuration modes of corresponding parts in an EDR frame. A configuration mode of the Access Code is consistent with a configuration mode of an Access Code in the LE frame and a configuration mode of an Access Code in the EDR frame. The frame to be transmitted is generated and transmitted by a modulation mode of the EDR frame and a Symbol Rate of the LE frame. According to the embodiment of the present disclosure, a frame to be transmitted is generated, and a configuration mode of each part of the frame to be transmitted is consistent with a configuration mode of a corresponding part in an LE frame and a corresponding part in a EDR frame respectively, so that a terminal may generate and transmit the frame to be transmitted by a modulation mode of the EDR frame and a Symbol Rate of the LE frame. Compared with a method in an existing technology which only adopts a modulation mode of the LE frame and a Symbol Rate of the LE frame to transmit, a Bit Rate obtained by the modulation mode of the LE frame is less than a Bit Rate obtained by the modulation mode of the EDR frame. The transmission rate may be improved according to the embodiment of the present disclosure.

In order to clarify the object, characteristic and advantages of embodiments of the present disclosure, the embodiments of present disclosure will be described clearly in detail in conjunction with accompanying drawings.

Figures 3, 4:
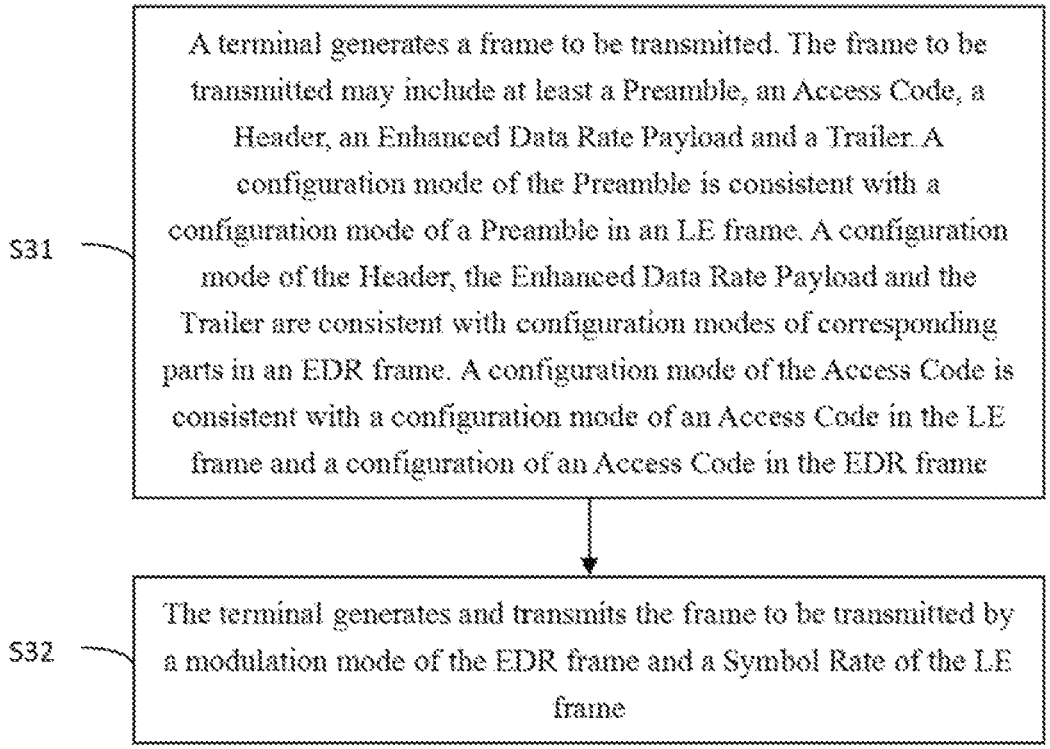
FIG. 3 schematically illustrates a flowchart of a Bluetooth communication method according to an embodiment of the present disclosure.
FIG. 4 schematically illustrates a structure diagram of a frame to be transmitted according to an embodiment of the present disclosure.

Referring to FIG. 3, FIG. 3 schematically illustrates a flowchart of a Bluetooth communication method according to an embodiment of the present disclosure. The Bluetooth communication method may include: S31 and S32.

In S31, a terminal generates a frame to be transmitted. The frame to be transmitted may include at least a Preamble, an Access Code, a Header, an Enhanced Data Rate Payload and a Trailer. A configuration mode of the Preamble is consistent with a configuration mode of a Preamble in an LE frame. A configuration mode of the Header, the Enhanced Data Rate Payload and the Trailer are consistent with configuration modes of corresponding parts in an EDR frame. A configuration mode of the Access Code is consistent with a configuration mode of an Access Code in the LE frame and a configuration of an Access Code in the EDR frame.

In S32, the terminal generates and transmits the frame to be transmitted by a modulation mode of the EDR frame and a Symbol Rate of the LE frame.

In a specific implementation of S31, the frame to be transmitted is generated through a combination of configuration modes of a plurality of parts in the EDR frame and the LE frame.

Referring to FIG. 4, FIG. 4 schematically illustrates a structure diagram of a frame to be transmitted according to an embodiment of the present disclosure. The frame to be transmitted includes at least a Preamble, an Access Code, a Header, an Enhanced Data Rate Payload and a Trailer. The frame to be transmitted includes at least one selected from a group consisting of: a Guard, an SYNC, and a CRC.

The Preamble is set to occupy 1 or 2 octets, the Access Code is set to occupy 4 octets, the Header is set to occupy 16 bits or 24 bits, and the CRC is set to occupy 3 octets. Wherein, 1 octet=8 bit.

Specifically, the configuration mode of the Preamble is consistent with the configuration mode of the Preamble in the LE frame as shown in FIG. 2.

The configuration modes of the Header, the Enhanced Data Rate Payload and the Trailer is consistent with the configuration modes of the corresponding parts in the EDR frame as shown in FIG. 1.

The Access Code in the frame to be transmitted may be called an Access-Address, the configuration mode of the Access Code may be consistent with the configuration mode of the Access Code in the LE frame as shown in FIG. 2 and the configuration mode of the Access Code in the EDR frame as shown in FIG. 1.

The configuration mode of the Guard may be consistent with the configuration mode of the Guard in the EDR frame as shown in FIG. 1.

The configuration mode of the SYNC may be consistent with the configuration mode of the SYNC in the EDR frame as shown in FIG. 1.

The configuration mode of the CRC may be consistent with the configuration mode of the CRC in the LE frame as shown in FIG. 2.

Continuing to refer to FIG. 3, in a specific implementation of S32, the frame to be transmitted may be generated and transmitted by the modulation mode of the EDR frame and the Symbol Rate of the LE frame, so that the characteristic that a ratio of the Bit Rate to the Symbol Rate of the EDR frame is higher may be utilized to improve the transmission rate.

Further, the LE frame may include a first modulation mode. A ratio of a Bit Rate to the Symbol Rate obtained based on the first modulation mode is determined as a first ratio. Before generating and transmitting the frame to be transmitted by the modulation mode of the EDR frame and the Symbol Rate of the LE frame, the method may include: the terminal modulates the frame to be transmitted by a second modulation mode. A ratio of a Bit Rate to a Symbol Rate obtained based on the second modulation mode is determined as a second ratio, and the second ratio is greater than the first ratio.

According to the embodiment of the present disclosure, the frame to be transmitted is modulated by a second modulation mode, and a ratio of a Bit Rate to a Symbol Rate obtained based on the second modulation mode is larger. Compared with an LE frame modulated by a first modulation mode, the embodiment of the present disclosure may improve the transmission rate.

Further, the second modulation mode may include a 8 DPSK; and the first modulation mode may include a GFSK.

According to the embodiment of the present disclosure, the second modulation mode is a 8 DPSK, that is, 8 symbols with different phases are used to represent binary bit information, so that a higher modulation mode may be obtained by the second modulation mode. Compared with the Bit Rate obtained by an existing frame modulation mode, the transmission rate may be improved.

More specifically, the existing frame may be an LE frame or a free communication mode, and the modulation mode may be the 8 DPSK, so that the ratio of the Bit Rate to the Symbol Rate obtained by the 8 DPSK is 3. Compared with the case where a ratio of the Bit Rate to the Symbol Rate obtained by the existing modulation mode of the LE frame is 1, the transmission rate is effectively improved.

Further, the second modulation mode may include one selected from a group consisting of: a π/4D-Quadrature Phase Shift Keying (π/4D-QPSK), a 16 Quadrature Amplitude Modulation (16 QAM), and a 64 Quadrature Amplitude Modulation (64 QAM).

The π/4-QPSK may be regarded as an improvement of a Quadrature Phase Shift Keying (QPSK). One of the improvements is to reduce a maximum phase jump of the QPSK from ±π to ±¾π.

It should be noted that the second modulation mode may also include other modulation modes higher than the first modulation mode. The other modulation modes higher than the first modulation mode may be used to indicate a modulation mode with a higher Bit Rate under a same Symbol Rate.

Further, the EDR frame and the LE frame are both determined based on the Bluetooth 5.0 protocol and both have a predefined value range of a Symbol Rate and a predefined value range of a Bit Rate. In a specific implementation of the embodiment of the present disclosure, the Bit Rate of the highest transmission rate of the EDR frame is 3 Mb/s, the Symbol Rate of the highest transmission rate of the EDR frame is 1 Msym/s, the Bit Rate of the highest transmission rate of the LE frame is 2 Mb/s, and the Symbol Rate of the highest transmission rate of the LE frame is 2 Msym/s.

Figure 5:
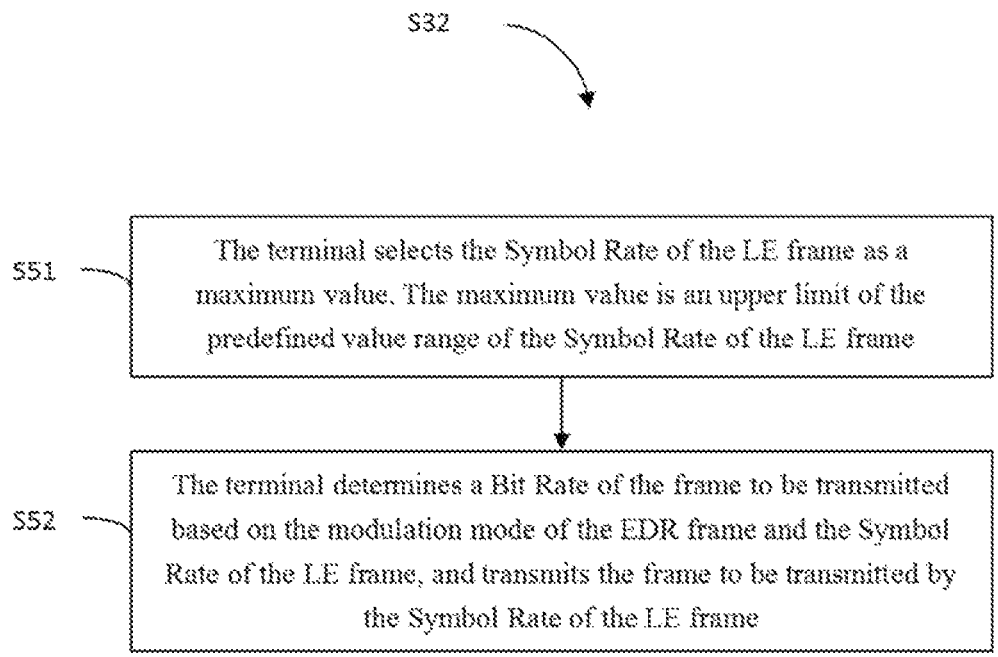
FIG. 5 schematically illustrates a flowchart of a specific implementation of S32 as shown in FIG. 3.

Referring to FIG. 5, FIG. 5 schematically illustrates a flowchart of a specific implementation of S32 as shown in FIG. 3. The process of generating and transmitting the frame to be transmitted by the modulation mode of the EDR frame and the Symbol Rate of the LE frame may include S51 and S52, which is described below.

In S51, the terminal selects the Symbol Rate of the LE frame as a maximum value. The maximum value is an upper limit of the predefined value range of the Symbol Rate of the LE frame.

Further, the upper limit of the predefined value range of the Symbol Rate of the LE frame is greater than the predefined Symbol Rate of the EDR frame, the upper limit of the predefined value range of the Symbol Rate of the LE frame is equal to an upper limit of the predefined Symbol Rate of the LE frame.

As an example, the Bit Rate of the highest transmission rate of the EDR frame is 3 Mb/s, the Symbol Rate of the highest transmission rate of the EDR frame is 1 Msym/s, the Bit Rate of the highest transmission rate of the LE frame is 2 Mb/s, and the Symbol Rate of the highest transmission rate of the LE frame is 2 Msym/s. An upper limit of 3 Mb/s of a predefined value range of the Bit Rate of the EDR frame is greater than the Bit Rate of 2 Mb/s of the maximum transmission rate of the LE frame, the predefined Symbol Rate of 2 Msym/s of the EDR frame is less than the Symbol Rate of 2 Msym/s of the LE frame.

In S52, the terminal determines a Bit Rate of the frame to be transmitted based on the modulation mode of the EDR frame and the Symbol Rate of the LE frame, and transmits the frame to be transmitted by the Symbol Rate of the LE frame.

It can be understood that the Bit Rate may be improved if the Symbol Rate of the frame to be transmitted is selected to be the maximum, and the modulation mode may be selected from the higher modulation mode.

In the embodiment of the present disclosure, based on a higher bandwidth characteristic of the Bluetooth 5.0 protocol, by selecting the Symbol Rate of the LE frame to be a maximum value determined by the Bluetooth 5.0 protocol, the Bit Rate of the frame to be transmitted is determined based on the modulation mode of the EDR frame and the symbol of the LE frame, and the frame to be transmitted is transmitted by the Symbol Rate of the LE frame.

According to the embodiment of the present disclosure, a frame to be transmitted is generated, and a configuration mode of each part of the frame to be transmitted is consistent with a configuration mode of a corresponding part in an LE frame and a corresponding part in a EDR frame respectively, so that a terminal may generate and transmit the frame to be transmitted by a modulation mode of the EDR frame and a Symbol Rate of the LE frame. Compared with a method in an existing technology which only adopts a modulation mode of the LE frame and a Symbol Rate of the LE frame to transmit, a Bit Rate obtained by the modulation mode of the LE frame is less than a Bit Rate obtained by the modulation mode of the EDR frame. The transmission rate may be improved according to embodiments of the present disclosure.

Figure 6:
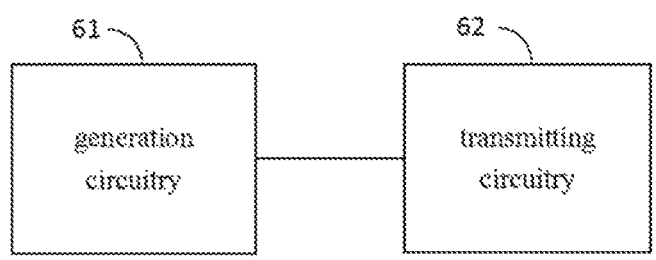
FIG. 6 schematically illustrates a structure diagram of a Bluetooth communication device according to an embodiment of the present disclosure.

Referring to FIG. 6, FIG. 6 schematically illustrates a structure diagram of a Bluetooth communication device according to an embodiment of the present disclosure. The Bluetooth communication device may include: a generation circuitry 61 and a transmitting circuitry 62.

The generation circuitry 61 is adapted to generate a frame to be transmitted, the frame to be transmitted may include at least a Preamble, an Access Code, a Header, an Enhanced Data Rate Payload and a Trailer, wherein a configuration mode of the Preamble is consistent with a configuration mode of a Preamble in an LE frame, a configuration mode of the Header, the Enhanced Data Rate Payload and the Trailer are consistent with configuration modes of corresponding parts in an EDR frame, a configuration mode of the Access Code is consistent with a configuration mode of an Access Code in the LE frame and a configuration mode of an Access Code in the EDR frame.

The transmitting circuitry 62 is adapted to generate and transmit the frame to be transmitted by a modulation mode of the EDR frame and a Symbol Rate of the LE frame.

For principles, specific implementations and beneficial effects of the Bluetooth communication device, reference may be made to the relevant descriptions in FIG. 3 to FIG. 5, which is not be repeated here.

It should be pointed out that the embodiment of the present disclosure may be applied to 5 Generation (5G) communication systems, 4G and 3G communication systems, and various new communication systems in the future, such as 6G and 7G.

In an embodiment of the present disclosure, a storage medium having computer instructions stored therein is provided, wherein when the computer instructions are executed, any one of the above methods for detecting interference is performed. In some embodiment, the storage medium may be a computer readable storage medium, and may include a non-volatile or a non-transitory memory, or include an optical disk, a mechanical hard disk, and a solid-state hard disk.

Specifically, in the embodiments of the present disclosure, the processor may be a Central Processing Unit (CPU), or other general processors, Digital Signal Processors (DSP), Application Specific Integrated Circuits (ASIC), Field Programmable Gate Arrays (FPGA) or other Programmable logic devices, discrete gates or transistor logic devices, discrete hardware components, and the like. A general processor may be a microprocessor or the processor may be any conventional processor or the like.

It should also be understood that the memory in the embodiments of the present disclosure may be either volatile memory or nonvolatile memory, or may include both volatile and nonvolatile memories. The non-volatile memory may be a Read-Only Memory (ROM), a Programmable ROM (PROM), an Erasable PROM (EPROM), an electrically Erasable EPROM (EEPROM), or a flash memory. The volatile memory may be a Random Access Memory (RAM) which functions as an external cache. By way of example but not limitation, various forms of RAM are available, such as Static Random Access Memory (SRAM), Dynamic Random Access Memory (DRAM), Synchronous Dynamic Random Access Memory (SDRAM), Double Data Rate Synchronous Dynamic Random Access Memory (DDR SDRAM), Enhanced SDRAM (ESDRAM), Synchronous connection to DRAM (SLDRAM), and Direct Rambus RAM (DR-RAM).

In an embodiment of the present disclosure, a terminal including a memory and a processor is provided, wherein the memory has computer instructions stored therein, and when the processor executes the computer instructions, above method as shown in FIGS. 3-5 is performed. The terminal may include but are not limited to terminal devices such as mobile phone, computer, and tablet computer.

Specifically, a terminal in embodiments of the present disclosure may refer to various forms of User Equipment (UE), access terminal, user unit, user station, Mobile Station (MS), remote station, remote terminal, mobile equipment, user terminal, terminal equipment, wireless communication equipment, user agent or user device. The terminal equipment may further be a cellular phone, a cordless phone, a Session Initiation Protocol (SIP) phone, a Wireless Local Loop (WLL) station, a Personal Digital Assistant (PDA), a handheld device with a wireless communication function, a computing device or other processing devices connected to a wireless modems, an in-vehicle device, a wearable device, a terminal equipment in the future 5G network, or a terminal equipment in a future evolved Public Land Mobile Network (PLMN), which is not limited in the embodiments of the present disclosure.

Although the present disclosure is disclosed as above, the present disclosure is not limited to this. Those skilled in the art can make various changes and modifications without departing from the spirit and scope of the present disclosure. Therefore, the protection scope of the present disclosure should be subject to the scope defined by the claims.

What is claimed is:

1. A Bluetooth communication method, comprising:
   generating a frame to be transmitted, wherein the frame to be transmitted comprises at least a Preamble, an Access Code, a Header, an Enhanced Data Rate Payload and a Trailer, wherein a configuration mode of the Preamble is consistent with a configuration mode of a Preamble in an Low Energy (LE) frame, a configuration mode of the Header, the Enhanced Data Rate Payload and the Trailer are consistent with configuration modes of corresponding parts in an Enhanced Data Rate (EDR) frame, a configuration mode of the Access Code is consistent with a configuration mode of an Access Code in the LE frame and a configuration mode of an Access Code in the EDR frame; and
   generating and transmitting the frame to be transmitted by a modulation mode of the EDR frame and a Symbol Rate of the LE frame.

2. The method according to claim 1, wherein the frame to be transmitted comprises at least one selected from a group consisting of: a Guard, a Synchronized (SYNC), and a Cyclic Redundancy Check (CRC);
   a configuration mode of the Guard is consistent with a configuration mode of a Guard in the EDR frame;
   a configuration mode of the SYNC is consistent with a configuration mode of a SYNC in the EDR frame; and
   a configuration mode of the CRC is consistent with a configuration mode of a CRC in the LE frame.

3. The method according to claim 1, wherein the LE frame comprises a first modulation mode, and a ratio of a Bit Rate to the Symbol Rate obtained based on the first modulation mode is determined as a first ratio; and before generating and transmitting the frame to be transmitted by the modulation mode of the EDR frame and the Symbol Rate of the LE frame, the method comprises:
modulating the frame to be transmitted by a second modulation mode;
determining a ratio of a Bit Rate to a Symbol Rate obtained based on the second modulation mode as a second ratio, wherein the second ratio is greater than the first ratio.

4. The method according to claim 3, wherein the second modulation mode comprises a 8 Differential Phase Shift Keying (8 DPSK); and
the first modulation mode comprises a Gauss Frequency Shift Keying (GFSK).

5. The method according to claim 3, wherein,
the second modulation mode comprises one selected from a group consisting of: a π/4D-Quadrature Phase Shift Keying (π/4D-QPSK), a 16 Quadrature Amplitude Modulation (16 QAM), and a 64 Quadrature Amplitude Modulation (64 QAM); and
the first modulation mode comprises a GFSK.

6. The method according to claim 1, wherein the EDR frame and the LE frame are both determined based on a Bluetooth 5.0 protocol, and both have a predefined value range of a Symbol Rate and a predefined value range of a Bit Rate; and
said generating and transmitting the frame to be transmitted by a modulation mode of the EDR frame and a Symbol Rate of the LE frame comprises:
selecting the Symbol Rate of the LE frame as a maximum value, the maximum value is an upper limit of the predefined value range of the Symbol Rate of the LE frame; and
determining a Bit Rate of the frame to be transmitted based on the modulation mode of the EDR frame and the Symbol Rate of the LE frame, and transmitting the frame to be transmitted by the Symbol Rate of the LE frame.

7. The method according to claim 6, wherein the upper limit of the predefined value range of the Symbol Rate of the LE frame is greater than the predefined Symbol Rate of the EDR frame, and is equal to an upper limit of the predefined Symbol Rate of the LE frame.

8. A Bluetooth communication device, comprising:
a generation circuitry, adapted to generate a frame to be transmitted, wherein the frame to be transmitted comprises at least a Preamble, an Access Code, a Header, an Enhanced Data Rate Payload and a Trailer, wherein a configuration mode of the Preamble is consistent with a configuration mode of a Preamble in an Low Energy (LE) frame, a configuration mode of the Header, the Enhanced Data Rate Payload and the Trailer are consistent with configuration modes of corresponding parts in an Enhanced Data Rate (EDR) frame, a configuration mode of the Access Code is consistent with a configuration mode of an Access Code in the LE frame and a configuration mode of an Access Code in the EDR frame; and
a transmitting circuitry, adapted to generate and transmit the frame to be transmitted by a modulation mode of the EDR frame and a Symbol Rate of the LE frame.

9. A non-transitory storage medium storing one or more programs, the one or more programs comprising computer instructions, which, when executed by a processor, cause the processor to:
generate a frame to be transmitted, wherein the frame to be transmitted comprises at least a Preamble, an Access Code, a Header, an Enhanced Data Rate Payload and a Trailer, wherein a configuration mode of the Preamble is consistent with a configuration mode of a Preamble in an Low Energy (LE) frame, a configuration mode of the Header, the Enhanced Data Rate Payload and the Trailer are consistent with configuration modes of corresponding parts in an Enhanced Data Rate (EDR) frame, a configuration mode of the Access Code is consistent with a configuration mode of an Access Code in the LE frame and a configuration mode of an Access Code in the EDR frame; and
generate and transmit the frame to be transmitted by a modulation mode of the EDR frame and a Symbol Rate of the LE frame.

10. The non-transitory storage medium according to claim 9, wherein the frame to be transmitted comprises at least one selected from a group consisting of: a Guard, a Synchronized (SYNC), and a Cyclic Redundancy Check (CRC);
a configuration mode of the Guard is consistent with a configuration mode of a Guard in the EDR frame;
a configuration mode of the SYNC is consistent with a configuration mode of a SYNC in the EDR frame; and
a configuration mode of the CRC is consistent with a configuration mode of a CRC in the LE frame.

11. The non-transitory storage medium according to claim 9, wherein the LE frame comprises a first modulation mode, and a ratio of a Bit Rate to the Symbol Rate obtained based on the first modulation mode is determined as a first ratio; and
before generating and transmitting the frame to be transmitted by the modulation mode of the EDR frame and the Symbol Rate of the LE frame, the processor is further caused to:
modulate the frame to be transmitted by a second modulation mode;
determine a ratio of a Bit Rate to a Symbol Rate obtained based on the second modulation mode as a second ratio, wherein the second ratio is greater than the first ratio.

12. The non-transitory storage medium according to claim 11, wherein the second modulation mode comprises a 8 Differential Phase Shift Keying (8 DPSK); and
the first modulation mode comprises a Gauss Frequency Shift Keying (GFSK).

13. The non-transitory storage medium according to claim 11, the second modulation mode comprises one selected from a group consisting of: a π/4D-Quadrature Phase Shift Keying (π/4D-QPSK), a 16 Quadrature Amplitude Modulation (16 QAM), and a 64 Quadrature Amplitude Modulation (64 QAM); and
the first modulation mode comprises a GFSK.

14. The non-transitory storage medium according to claim 9, wherein the EDR frame and the LE frame are both determined based on a Bluetooth 5.0 protocol, and both have a predefined value range of a Symbol Rate and a predefined value range of a Bit Rate; and
said generating and transmitting the frame to be transmitted by a modulation mode of the EDR frame and a Symbol Rate of the LE frame comprises:
selecting the Symbol Rate of the LE frame as a maximum value, the maximum value is an upper limit of the predefined value range of the Symbol Rate of the LE frame; and
determining a Bit Rate of the frame to be transmitted based on the modulation mode of the EDR frame and the Symbol Rate of the LE frame, and transmitting the frame to be transmitted by the Symbol Rate of the LE frame.

15. The non-transitory storage medium according to claim 14, wherein the upper limit of the predefined value range of the Symbol Rate of the LE frame is greater than the predefined Symbol Rate of the EDR frame, and is equal to an upper limit of the predefined Symbol Rate of the LE frame.

* * * * *